United States Patent [19]

Nagasaki et al.

[11] Patent Number: 4,803,250

[45] Date of Patent: Feb. 7, 1989

[54] RUBBER COMPOSITION WITH BISMALEIMIDES

[75] Inventors: Hideo Nagasaki, Osaka; Yasuzi Takemoto, Sakai, both of Japan

[73] Assignee: Sumitomo Chemical Company, Limited, Osaka, Japan

[21] Appl. No.: 20,227

[22] Filed: Mar. 2, 1987

Related U.S. Application Data

[63] Continuation of Ser. No. 814,881, Dec. 30, 1985, abandoned.

[30] Foreign Application Priority Data

Jan. 19, 1985 [JP] Japan ................................ 60-7888
Jan. 22, 1985 [JP] Japan ................................ 60-10226

[51] Int. Cl.$^4$ ............................................. C08C 19/20
[52] U.S. Cl. ........................... 525/329.3; 525/331.8; 525/331.1; 525/332.7; 525/341; 525/347; 525/348
[58] Field of Search ............... 525/347, 348, 333.5, 525/333.6, 331.1, 331.7, 331.8, 329.3, 332.7

[56] References Cited

U.S. PATENT DOCUMENTS

| | | | |
|---|---|---|---|
| 1,981,168 | 11/1934 | Gerke | 524/112 |
| 2,524,424 | 10/1950 | Buret | 525/354 |
| 2,757,155 | 7/1956 | Sudekum | 524/112 |
| 2,879,245 | 3/1959 | Green | 524/112 |
| 2,989,504 | 6/1961 | Little | 525/331.1 |
| 3,419,521 | 12/1968 | Scott | 525/341 |
| 3,915,943 | 10/1975 | Wright | 525/329.3 |
| 4,569,958 | 2/1986 | Maeda | 524/100 |

FOREIGN PATENT DOCUMENTS 1092162A 5/1984 U.S.S.R. .
1151551A 4/1985 U.S.S.R. .

OTHER PUBLICATIONS

International Polymer Science and Technology, vol. 4, No. 12, 1977, pp. T48-T50; Rubber and Plastics Research Association of Great Britain, Awbury, GB, A. S. Prashchikina et al.: High Temperature Curing of General-Purpose Rubbers with a Curing System Comprising a Bismaleimide and Sulphur.

*Primary Examiner*—Christopher Henderson
*Attorney, Agent, or Firm*—Stevens, Davis, Miller & Mosher

[57] ABSTRACT

A rubber composition containing
(A) a bismaleimide compound represented by the general formula (I)

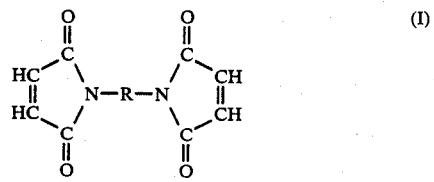

wherein R is a divalent acyclic aliphatic group, cyclic aliphatic group, aromatic group, or alkylaromatic group, these groups optionally containing a hetero atom selected from O, N and S in their chain or side substituent,
(B) a sulfenamide compound represented by the general formula (II)

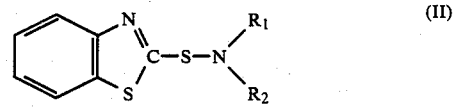

wherein $R_1$ and $R_2$ denote independently from each other a hydrogen atom, an acyclic aliphatic group, or cyclic aliphatic group, or $R_1$ and $R_2$ together denote a chain aliphatic group which optionally contains an oxygen atom, provided that $R_1$ and $R_2$ cannot simultaneously denote a hydrogen atom,
(C) a dithiophosphoric acid compound represented by the general formula (III)

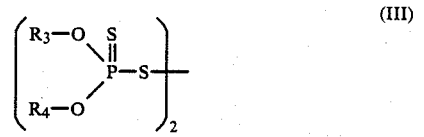

wherein $R_3$ and $R_4$ denote each an aliphatic group, and
(D) sulfur; or
(A) a bismaleimide compound represented by the general formula (I) defined above,
(E) an aromatic carboxylic acid anhydride,
(F) sulfur and/or a sulfur donor, and
(G) volcanization accelerators.

6 Claims, No Drawings

RUBBER COMPOSITION WITH BISMALEIMIDES

This application is a continuation of application Ser. No. 814,881, filed Dec. 30, 1985, now abandoned.

BACKGROUND OF THE INVENTION

1. Field of the Invention

This invention relates to a rubber composition having improved rubber properties. More particularly, it relates to a rubber composition which is excellent in resistance to reversion in the vulcanization step and is excellent in such rubber properties as resistance to thermal degradation and resistance to deterioration due to flex cracking.

2. Description of the Prior Art

In recent years, increasingly higher levels of mechanical properties and heat resistance than before have come to be required for rubber goods such as tires and belts.

It has been known for a long time for improving the mechanical properties of rubber to use a large amount of sulfur as a cross-linking agent to increase the cross-linking density. However, the use of a large amount of sulfur has a serious defect in that is gives rise to a severe reversion in the vulcanization step and a marked decrease in resistance to heat and resistance to flex cracking in vulcanized rubbers, although it improves such mechanical properties of vulcanized rubber as hardness and tensile strength.

To obviate such a defect of sulfur cross-linking, there has been also proposed a method of adding a bismaleimide compound to a sulfur vulcanization system containing dibenzothiazyl disulfide (MBTS) or tetramethylthiuram disulfide (TMTD). However, though the use of this method can correct the above-mentioned defect to some extent, the improvement is not yet fully satisfactory. Moreover, the method have difficulties in that since it requires a large amount of costly bismaleimide compounds it leads to a marked increase in cost of rubber compounds and further that when a vulcanization accelerator of sulfenamide type, which is used chiefly for tires and the like in rubber industry, is used in place of MBTS or TMTD the effect of addition of bismaleimide compound is hardly observed, so that vulcanization accelerators which can be used in combination with bismaleimide compounds are limited to those giving a short scorch time such as MBTS and TMTD, and consequently it can be used only in a limited field such as the manufacture of footwears.

Thus, prior art rubber compositions are not simultaneously satisfactory in such properties as scorching stability, resistance to reversion, resistance to thermal degradation, and resistance to deterioration due to flex cracking.

In view of these circumstances, the present inventors have made an extensive study to obtain rubber compositions which, in all the sulfur vulcanization systems including those containing sulfenamide type accelerators, show an excellent resistance to reversion in vulcanization step and exhibit excellent rubber properties including resistance to thermal degradation and resistance to flex cracking. As a result, it has been found that a rubber composition comprising natural rubber and/or synthetic rubber compounded with a bismaleimide compound represented by the general formula (I), a sulfenamide compound represented by the general formula (II), a dithiophosphoric acid compound represented by the general formula (III), which are mentioned later, and sulfur, or a rubber composition comprising natural rubber and/or synthetic rubber compounded with a bismaleimide compound represented by the general formula (I) mentioned later, an aromatic carboxylic acid anhydride, sulfur and/or a sulfur donor and vulcanization accelerators can, for the first time in all the sulfur vulcanization systems including those containing sulfenamide type accelerators, give mechanical properties which are in no way inferior to those obtainable by using a large amount of sulfur and further show markedly improved properties including resistance to reversion, resistance to heat aging, and resistance to flex cracking, the insufficiency of which properties has been the defect of sulfur vulcanization. This invention has been achieved on the basis of above findings.

SUMMARY OF THE INVENTION

Thus, according to this invention, there is provided a rubber composition containing (A) a bismaleimide compound represented by the general formula (I)

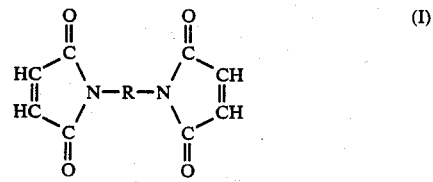

wherein R is a divalent acyclic aliphatic group, cyclic aliphatic group, aromatic group, or alkylaromatic group, these groups optionally containing a hetero atom selected from O, N and S in their chain or side substituent, (B) a sulfenamide compound represented by the general formula (II)

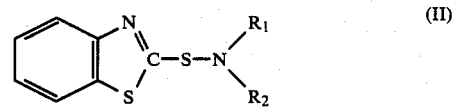

wherein $R_1$ and $R_2$ denote independently from each other, a hydrogen atom, an acyclic aliphatic group, or cyclic aliphatic group; or $R_1$ and $R_2$ together denote a chain aliphatic group which optionally contains an oxygen atom, provided that $R_1$ and $R_2$ cannot simultaneously denote a hydrogen atom, (C) a dithiophosphoric acid compound represented by the general formula (III)

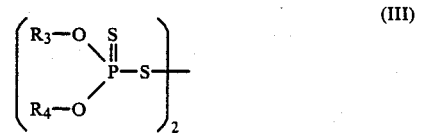

wherein $R_3$ and $R_4$ denote each an aliphatic group, and
(D) sulfur; or
(A) a bismaleimide compound represented by the general formula (I) defined above,
(E) an aromatic carboxylic acid anhydride,
(F) sulfur and/or a sulfur donor, and (G) vulcanization accelerators.

These rubber compositions have a stable scorching property and are excellent in resistances to reversion, thermal degradation and flex cracking.

DETAILED DESCRIPTION OF THE INVENTION

The bismaleimide compound represented by the general formula (I) used in this invention include, for example,
N,N'-ethylenebismaleimide,
N,N'-hexamethylenebismaleimide,
N,N'-dodecamethylenebismaleimide,
N,N'-(2,2,4-trimethylhexamethylene)bismaleimide,
N,N'-(oxydipropylene)bismaleimide,
N,N'-(aminodipropylene)bismaleimide,
N,N'-(ethylenedioxydipropylene)bismaleimide,
N,N'-(1,4-cyclohexylene)bismaleimide,
N,N'-(1,3-cyclohexylene)bismaleimide,
N,N'-(methylene-1,4-dicyclohexylene)bismaleimide,
N,N'-(isopropylidene-1,4-dicyclohexylene)bismaleimide,
N,N'-(oxy-1,4-dicyclohexylene)bismaleimide,
N,N'-(m-phenylene)bismaleimide,
N,N'-(p-phenylene)bismaleimide,
N,N'-(o-phenylene)bismaleimide,
N,N'-(1,3-naphthylene)bismaleimide,
N,N'-(1,4-naphthylene)bismaleimide,
N,N'-(1,5-naphthylene)bismaleimide,
N,N'-(3,3'-dimethyl-4,4'-biphenylene)bismaleimide,
N,N'-(3,3'-dichloro-4,4'-biphenylene)bismaleimide,
N,N'-(2,4-pyridyl)bismaleimide,
N,N'-(2,6-pyridyl)bismaleimide,
N,N'-(4-methyl-2,6-pyridyl)bismaleimide,
N,N'-(1,4-anthraquinonediyl)bismaleimide,
N,N'-(m-tolylene)bismaleimide,
N,N'-(p-tolylene)bismaleimide,
N,N'-(4,6-dimethyl-1,3-phenylene)bismaleimide,
N,N'-(2,3-dimethyl-1,4-phenylene)bismaleimide,
N,N'-(4,6-dichloro-1,3-phenylene)bismaleimide,
N,N'-(5-chloro-1,3-phenylene)bismaleimide,
N,N'-(5-hydroxy-1,3-phenylene)bismaleimide,
N,N'-(5-methoxy-1,3-phenylene)bismaleimide,
N,N'-(m-xylylene)bismaleimide,
N,N'-(p-xylylene)bismaleimide,
N,N'-(methylenedi-p-phenylene)bismaleimide,
N,N'-(isopropylidenedi-p-phenylene)bismaleimide,
N,N'-(oxydi-p-phenylene)bismaleimide,
N,N'-(thiodi-p-phenylene)bismaleimide,
N,N'-(dithiodi-p-phenylene)bismaleimide,
N,N'-(sulfodi-p-phenylene)bismaleimide, and
N,N'-(carbonyldi-p-phenylene)bismaleimide.

The sulfenamide compounds represented by the general formula (II) used in this invention include, for example,
N-cyclohexyl-2-benzothiazylsulfenamide,
N-oxydiethylene-2-benzothiazylsulfenamide,
N-t-butyl-2-benzothiazylsulfenamide,
N,N-diisopropyl-2-benzothiazylsulfenamide, and
N,N-dicyclohexyl-2-benzothiazylsulfenamide.

The dithiophosphoric acid compounds represented by the general formula (III) used in this invention include, for example,
diethyldithiophosphoric acid disulfide,
di-isopropyldithiophosphoric acid disulfide,
di-n-propyldithiophosphoric acid disulfide,
dibutyldithiophosphoric acid disulfide,
dihexyldithiophosphoric acid disulfide,
dicyclohexyldithiophosphoric acid disulfide, and
dioctyldithiophosphoric acid disulfide.

Examples of sulfur include various types of sulfur such as powdered sulfur, precipitated sulfur, and insoluble sulfur.

Examples of aromatic carboxylic acid anhydrides, another important constituent in this invention, include phthalic anhydride, pyromellitic anhydride, benzenehexacarboxylic trianhydride, 4-methylphthalic anhydride, trimellitic anhydride, and 4-chlorophthalic anhydride.

Phthalic anhydride and the like mentioned above have for long been known to the rubber industry as scorch retarders. However, other known scorch retarders than these, namely organic acids such as salicylic acid and benzoic acid, maleic anhydride, N-nitrosodiphenylamine, N-cyclohexylphthalimide and the like do not show such effect as is obtained in this invention even when combined with above-mentioned bismaleimide compounds (I). The latter compounds can give a remarkable effect only when used in combination with the above-mentioned aromatic acid anhydride.

The examples of sulfur donors include tetramethylthiuram disulfide, tetraethylthiuram disulfide, tetrabutylthiuram disulfide, and pentamethylthiuram hexasulfide.

The examples of vulcanization accelerators include dibenzothiazyl disulfide, tetramethylthiuram disulfide, N-cyclohexyl-2-benzothiazylsulfenamide, N-oxydiethylene-2-benzothiazylsulfenamide, N-t-butyl-2-benzothiazylsulfenamide, and N,N-dicyclohexyl-2-benzothiazylsulfenamide.

Examples of rubbers usable in this invention include natural rubber (NR), styrene-butadiene rubber (SBR), butadiene rubber (BR), isoprene rubber (IR), acrylonitrile-butadiene rubber (NBR), chloroprene rubber (CR), ethylene-propylene-diene terpolymer (EPDM), and isoprene-isobutylene rubber (IIR), used each alone or in combination of two or more thereof.

The amount of the bismaleimide compound (I), the sulfenamide compound (II), the dithiophosphoric acid compound (III), and sulfur to be compounded with rubber is, based on 100 parts by weight of rubber, usually 0.1 to 8 parts by weight, preferably 0.3 to 4 parts by weight, for bismaleimide compounds (I); usually 0.1 to 8 parts by weight, preferably 0.3 to 6 parts by weight, for sulfenamide compounds; usually 0.1 to 8 parts by weight, preferably 0.3 to 6 parts by weight, for dithiophosphoric acid compounds; and usually 0.1 to 14 parts by weight, preferably 0.5 to 8 parts by weight for sulfur.

Further, the amount of the bismaleimide compound (I), the aromatic carboxylic acid anhydride, the sulfur and/or the sulfur donor and the vulcanization accelerator to be compounded with rubber is, based on 100 parts by weight of rubber, usually 0.1 to 8 parts by weight, preferably 0.3 to 4 parts by weight for mismaleimide compounds (I); usually 0.1 to 4 parts by weight, preferably 0.3 to 3 parts by weight for aromatic carboxylic acid anhydrides; usually 0.1 to 14 parts by weight, preferably 0.5 to 8 parts by weight, for sulfur and/or sulfur donors, and usually 0.1 to 8 parts by weight, preferably 0.3 to 6 parts by weight for vulcanization accelerators.

These ingredients may be used as a mixture prepared beforehand or added separately together with, as required, other compounding ingredients at the time of compounding.

Other compounding ingredients include reinforcing agents, for example carbon black, such as HAF, ISAF and SRF, silica, and calcium carbonate; stearic acid, zinc white, process oil, tackifiers, waxes, antioxidants, etc.

The rubber composition of this invention thus obtained shows excellent scorch stability and resistance to reversion in processing and vulcanization and further, as to rubber properties after vulcanization, shows very excellent resistance to heat aging and to flex cracking.

This invention will be explained in detail below with reference to Examples, but it is not limited thereto.

In the Examples, "parts" means parts by weight.

EXAMPLE 1

In a conventional manner, 100 parts of natural rubber, 45 parts of HAF carbon, 5 parts of zinc white, 1 part of stearic acid, 1 part of process oil, 3 parts of wax, 2 parts of N-phenyl-N'-1,3-dimethylbutyl-p-phenylenediamine (an antiozonant) and the compounding ingredients listed in Table 1 were compounded by using an open roll of 6 inches diameter to prepare various rubber compositions.

With each of the rubber compositions thus obtained, scorching property was determined according to JIS-K-6300, and the maximum cross-linking density ($M_H$) and the vulcanization-reverse property (the time required for torque to decrease by 1 kg.cm from its maximum value; Rt) were determined according to ASTM-D-0284 by using an oscillating disc rheometer at 170° C.

Further, each of the various rubber compositions was vulcanized at 170° C. for 20 minutes to prepare prescribed specimens and then subjected to a thermal aging test and a flex cracking test according to JIS-K-6301. The thermal aging test was conducted by subjecting the specimen to thermal aging at 100° C. for 48 hours in a Geer Oven and then measuring the percentage of retention of tensile strength. The flex cracking test was conducted by subjecting a specimen, on which a crack of 2 mm original length had been made, to 10,000 times of flexing and then measuring the length of the crack.

The results obtained by these tests are shown in Table 1.

EXAMPLE 2

In the same manner as in Example 1, 100 parts of styrene-butadiene rubber, 50 parts of HAF carbon, 5 parts of process oil, 5 parts of zinc white, 3 parts of stearic acid, 3 parts of wax, 2 parts of 2,2,4-trimethyl-1,2-dihydroquinoline polymer (an antioxidant) and the ingredients listed in Table 2 were compounded to prepare various rubber compositions and their properties were determined. The results are shown in Table 2. The thermal aging test in this Example was conducted at 110° C. for 48 hours.

EXAMPLE 3

In a conventional manner, 100 parts of natural rubber, 5 parts of HAF carbon, 5 parts of zinc white, 1 part of stearic acid, 1 part of process oil, 3 parts of wax, 2 parts of N-phenyl-N'-1,3-dimethylbutyl-p-phenylenediamine (an antiozonant) and the ingredients listed in Table 3 were compounded by using an open roll of 6 inches diameter to prepare various rubber compositions.

With each of the rubber compositions thus obtained, the maximum cross-linking density ($M_H$) and the vulcanization-reverse property (the time required for torque to decrease by 1 kg.cm from its maximum value; Rt) were determined according to ASTM-D-2084 by using an oscillating disc rheometer at 170° C.

Further, each of the various rubber compositions was vulcanized at 170° C. for 20 minutes to prepare prescribed specimens and then subjected to a thermal aging test and a flex cracking test according to JIS-K-6301. The thermal aging test was conducted by subjecting a specimen to thermal aging at 100° C. for 48 hours in a Gear Oven and then measuring the percentage of retention of tensile strength. The flex cracking test was conducted by subjecting a specimen, on which a cut of 2 mm original length had been made, to 10,000 times of flexing and then measuring the length of the cut.

The results obtained are shown in Table 3.

EXAMPLE 4

In the same manner as in Example 3, 100 parts of styrene-butadiene rubber, 50 parts of HAF carbon, 5 parts of process oil, 5 parts of zinc white, 3 parts of stearic acid, 3 parts of wax, 2 parts of 2,2,4-trimethyl-1,2-dihydroquinoline polymer (an antioxidant), and ingredients listed in Table 4 were compounded to prepare various rubber compositions and their properties were determined. The results obtained are shown in Table 4. The thermal aging test in this Example was conducted at 110° C. for 48 hours.

EXAMPLE 5

In the same manner as in Example 3, 100 parts of acrylonitrile-butadiene rubber, 3 parts of stearic acid, 5 parts of zinc white, 10 parts of process oil, 40 parts of light calcium carbonate, 10 parts of titanium oxide, 30 parts of hydrated silica, 2 parts of 2,2'-methylenebis(4-methyl-6-t-butylphenol) (an antioxidant) and the ingredients listed in Table 5 were compounded to prepare various rubber compositions and their properties were determined. The results obtained are shown in Table 5. The thermal aging test in this Example was conducted at 130° C. for 48 hours.

TABLE 1

| Item | Run No. | Example | | | | | | Comparative Example | | |
|---|---|---|---|---|---|---|---|---|---|---|
| | | 1 | 2 | 3 | 4 | 5 | 6 | 7 | 8 | 9 |
| Compounding ingredients | | | | | | | | | | |
| Sulfur | | 1 | 1 | 1 | 1 | 1 | 1 | 1 | 2 | 1 |
| Soxinol ® NBS*[1] | | 1 | 1 | 1 | 1 | | | 2.5 | 2.5 | |
| Soxinol ® NS*[2] | | | | | | 1 | | | | 2.5 |
| Soxinol ® DZ*[3] | | | | | | | 1 | | | |
| Diethyldithiophosphoric acid disulfide | | 1.5 | | | | | | | | |
| Di-iso-propyldithiophosphoric acid disulfide | | | 1.5 | 1.5 | 1.5 | 1.5 | 1.5 | | | |
| N,N'—Ethylenebismaleimide | | | 1.5 | | | | | | | |
| N,N'—m-phenylenebismaleimide | | | | 1.5 | 2.5 | 1.5 | | | | |
| N,N'—(methylene-di-p-phenylene)bismaleimide | | | | | | | 1.5 | | | |
| Soxinol ® DM*[4] | | | | | | | | | | |
| Properties | | | | | | | | | | |

TABLE 1-continued

| | | | | | | | | | | |
|---|---|---|---|---|---|---|---|---|---|---|
| Scorching property (minute) | | 56.0 | 56.5 | 57.0 | 58.5 | 51.5 | 38.5 | 45.0 | 38.0 | 42.0 |
| MH (kg · cm) | | 98 | 97 | 97 | 106 | 97 | 96 | 72 | 90 | 70 |
| Rt (minute) | | >15 | >15 | >15 | >15 | >15 | >15 | 1.8 | 1.0 | 1.8 |
| Thermal resistance (%) | | 75 | 76 | 77 | 78 | 77 | 76 | 50 | 39 | 49 |
| Resistance to flex cracking (mm) | | 9.2 | 9.1 | 9.1 | 9.1 | 9.1 | 9.1 | 9.0 | 13.0 | 9.1 |

| | | Comparative Example | | | | | | | | |
|---|---|---|---|---|---|---|---|---|---|---|
| Item | Run No. | 10 | 11 | 12 | 13 | 14 | 15 | 16 | 17 | 18 | 19 |
| Compounding ingredients | | | | | | | | | | | |
| Sulfur | | 1 | 1 | 1 | 1 | 1 | 1 | 1 | 1 | 1 | 1 |
| Soxinol ® NBS*1 | | | | | 2.5 | | | | | | |
| Soxinol ® NS*2 | | | | | | 2.5 | | | | | |
| Soxinol ® DZ*3 | | 2.5 | | | | | 2.5 | | | | |
| Diethyldithiophosphoric acid disulfide | | | 2.5 | | | | | 2.5 | | | |
| Di-iso-propyldithiophosphoric acid disulfide | | | | 2.5 | | | | | 2.5 | | |
| N,N′—Ethylenebismaleimide | | | | | 1.5 | | | 1.5 | | | 1.5 |
| N, N′—m-phenylenebismalimide | | | | | | 1.5 | | | 1.5 | | |
| N,N′—(methylene-di-p-phenylene)bismaleimide | | | | | | | 1.5 | | | | |
| Soxinol ® DM*4 | | | | | | | | | | 2.5 | 2.5 |
| Properties | | | | | | | | | | | |
| Scorching property (minute) | | 46.0 | 54.0 | 54.0 | 46.0 | 44.0 | 50.5 | 56.0 | 56.5 | 18.5 | 19.0 |
| MH (kg · cm) | | 68 | 53 | 55 | 74 | 78 | 70 | 82 | 88 | 54 | 84 |
| Rt (minute) | | 1.4 | 2.2 | 2.2 | 3.1 | 3.2 | 3.1 | 3.2 | 3.3 | 1.5 | 4.0 |
| Thermal resistance (%) | | 53 | 55 | 56 | 52 | 53 | 52 | 55 | 57 | 39 | 55 |
| Resistance to flex cracking (mm) | | 9.5 | 9.1 | 9.3 | 9.0 | 9.1 | 9.1 | 9.2 | 9.3 | 8.6 | 11.5 |

Note:
*1Soxinol ® NBS: N—Oxydiethylene-2-benzothiazylsulfenamide (mfd. by Sumitom Chemical Co., Ltd.)
*2Soxinol ® NS: N—t-Butyl-2-benzothiazylsulfenamide (mfd. by Sumitom Chemical Co., Ltd.)
3Soxinol ® DZ: N,N—Dicyclohexyl-2-benxothiazylsulfenamide (mfd. by Sumitomo Chemical Co., Ltd.)
*4Soxinol ® DM: Dibenzothiazyl disulfide (mfd. by Sumitom Chemical Co., Ltd.)

TABLE 2

| | | Example | | | | | Comparative Example | | |
|---|---|---|---|---|---|---|---|---|---|
| Item | Run No. | 1 | 2 | 3 | 4 | 5 | 6 | 7 | 8 |
| Compounding ingredients | | | | | | | | | |
| Sulfur | | 2 | 2 | 2 | 2 | 2 | 2 | 3 | 2 |
| Soxinol ® CZ*1 | | 1 | 1 | 1 | | | 2 | 2 | 2 |
| Soxinol ® NBS*2 | | | | | 1 | 1 | | | |
| Soxinol ® DM*3 | | | | | | | | | |
| Di-iso-propyldithiophosphoric acid disulfide | | 1 | 1 | | 1 | | | | |
| Dibutyldithiophosphoric acid disulfide | | | | 1 | | 1 | | | |
| N,N′—p-Phenylenebismaleimide | | 1.5 | | | | 1.5 | | | 1.5 |
| N,N′—m-Phenylenebismaleimide | | | 1.5 | | 1.5 | | | | |
| N,N′—(Oxy-p-phenylene)bismaleimide | | | | 1.5 | | | | | |
| Properties | | | | | | | | | |
| MH (kg · cm) | | 126 | 127 | 127 | 130 | 128 | 103 | 128 | 104 |
| Thermal resistance (%) | | 78 | 78 | 79 | 78 | 79 | 61 | 53 | 63 |
| Resistance to flex cracking (mm) | | 13.1 | 13.2 | 13.0 | 13.1 | 13.0 | 12.3 | 19.5 | 12.7 |

| | | Comparative Example | | | | | | | | |
|---|---|---|---|---|---|---|---|---|---|---|
| Item | Run No. | 9 | 10 | 11 | 12 | 13 | 14 | 15 | 16 | 17 |
| Compounding ingredients | | | | | | | | | | |
| Sulfur | | 2 | 2 | 2 | 2 | 2 | 2 | 2 | 2 | 2 |
| Soxinol ® CZ*1 | | 2 | 2 | | | | | | | |
| Soxinol ® NBS*2 | | | | 2 | 2 | | | | | |
| Soxinol ® DM*3 | | | | | | | | | 2 | 2 |
| Di-iso-propyldithiophosphoric acid disulfide | | | | | | 2 | 2 | | | |
| Dibutyldithiophosphoric acid disulfide | | | | | | | | 2 | | |
| N,N′—p-Phenylenebismaleimide | | | | | 1.5 | 1.5 | | | | 1.5 |
| N,N′—m-Phenylenebismaleimide | | 1.5 | | 1.5 | | | 1.5 | | | |
| N,N′—(Oxy-p-phenylene)bismaleimide | | | 1.5 | | | | | 1.5 | | |
| Properties | | | | | | | | | | |
| MH (kg · cm) | | 105 | 104 | 100 | 101 | 85 | 86 | 86 | 98 | 119 |
| Thermal resistance (%) | | 62 | 64 | 62 | 63 | 67 | 67 | 66 | 61 | 51 |
| Resistance to flex cracking (mm) | | 12.8 | 12.7 | 12.2 | 12.3 | 11.4 | 11.5 | 11.3 | 12.0 | 18.6 |

Note:
*1Soxinol ® CZ: N—Cyclohexyl-2-benzothiazylsulfenamide (mfd. by Sumitomo Chemical Co., Ltd.)
*2Soxinol ® NBS: N—Oxydiethylene-2-benzothiazylsulfenamide (mfd. by Sumitomo Chemical Co., Ltd.)
*3Soxinol ® DM: Dibenzothiazyl disulfide (mfd. by Sumitomo Chemical Co., Ltd.)

TABLE 3

| | | Example | | | | | | | |
|---|---|---|---|---|---|---|---|---|---|
| Item | Run No. | 1 | 2 | 3 | 4 | 5 | 6 | 7 | 8 |
| Compounding ingredients | | | | | | | | | |
| Sulfur | | 1.0 | 1.0 | 1.0 | 1.0 | 1.0 | 1.0 | 0.5 | 0.5 |

TABLE 3-continued

| Item | | | | | | | | | |
|---|---|---|---|---|---|---|---|---|---|
| Soxinol ® DM*1 | 1.5 | 1.5 | 1.5 | 1.5 | 1.5 | 1.5 | | | |
| Soxinol ® NBS*2 | | | | | | | | 2.5 | 2.5 |
| N,N'—Hexamethylenebismaleimide | 1.5 | | | | | | | | |
| N,N'—p-Phenylenebismaleimide | | 1.5 | | | | | | | |
| N,N'—m-Phenylenebismaleimide | | | 0.5 | 1.5 | 2.5 | 1.5 | | 1.5 | 1.5 |
| N,N'—(methylene-di-p-phenylene)bismaleimide | | | | | | | | | |
| N,N'—(Oxy-di-p-phenylene)bismaleimide | | | | | | | | | |
| Phthalic anhydride | 1 | 1 | 1 | 1 | 1 | | | 1 | 2 |
| Trimellitic anhydride | | | | | | 1 | | | |
| Maleic anhydride | | | | | | | | | |
| Phthalic acid | | | | | | | | | |
| N—Nitrosodiphenylamine | | | | | | | | | |
| Properties | | | | | | | | | |
| MH (kg · cm) | 113 | 115 | 92 | 116 | 128 | 112 | 98 | 107 | |
| Rt (minute) | >15 | >15 | >15 | >15 | >15 | >15 | >15 | >15 | |
| Thermal resistance (%) | 63 | 62 | 59 | 64 | 69 | 62 | 71 | 71 | |
| Resistance to flex cracking (mm) | 9.3 | 9.3 | 9.1 | 9.3 | 9.3 | 9.3 | 9.2 | 9.2 | |

| | | Example | | Comparative Example | | | | | | | | |
|---|---|---|---|---|---|---|---|---|---|---|---|---|
| Item | Run No. | 9 | 10 | 11 | 12 | 13 | 14 | 15 | 16 | 17 | 18 | 19 | 20 |
| Compounding ingredients | | | | | | | | | | | | | |
| Sulfur | | 0.5 | 0.5 | 1.0 | 2.0 | 1.0 | 1.0 | 1.0 | 1.0 | 1.0 | 1.0 | 1.0 | 0.5 |
| Soxinol ® DM*1 | | | | 1.5 | 1.5 | 1.5 | 1.5 | 1.5 | 1.5 | 1.5 | 1.5 | 1.5 | |
| Soxinol ® NBS*2 | | 2.5 | 2.5 | | | | | | | | | | 2.5 |
| N,N'—Hexamethylenebismaleimide | | | | | | | | 1.5 | | 1.5 | | | |
| N,N'—p-Phenylenebismaleimide | | | | | | | | | | | 1.5 | | |
| N,N'—m-Phenylenebismaleimide | | | | | | | | | 1.5 | | | 1.5 | |
| N,N'—(methylene-di-p-phenylene)bismaleimide | | 1.5 | | | | | | | | | | | |
| N,N'—(Oxy-di-p-phenylene)bismaleimide | | | 1.5 | | | | | | | | | | |
| Phthalic anhydride | | 1 | | | | 1 | | | | | | | |
| Trimellitic anhydride | | | 1 | | | | 1 | | | | | | |
| Maleic anhydride | | | | | | | | 1 | | | | | |
| Phthalic acid | | | | | | | | | | | | | |
| N—Nitrosodiphenylamine | | | | | | | | | | 1 | | | |
| Properties | | | | | | | | | | | | | |
| MH (kg · cm) | | 96 | 96 | 68 | 87 | 66 | 63 | 80 | 81 | 78 | 79 | 80 | 58 |
| Rt (minute) | | >15 | >15 | 1.5 | 0.7 | 1.5 | 1.5 | 3.4 | 3.4 | 3.4 | 3.4 | 3.4 | 1.8 |
| Thermal resistance (%) | | 70 | 70 | 40 | 32 | 40 | 39 | 54 | 53 | 53 | 52 | 53 | 48 |
| Resistance to flex cracking (mm) | | 9.2 | 9.2 | 7.5 | 11.5 | 7.6 | 7.5 | 9.1 | 9.2 | 9.2 | 9.2 | 9.1 | 8.8 |

| | | Comparative Example | | | | | | | | | |
|---|---|---|---|---|---|---|---|---|---|---|---|
| Item | Run No. | 21 | 22 | 23 | 24 | 25 | 26 | 27 | 28 | 29 | 30 |
| Compounding ingredients | | | | | | | | | | | |
| Sulfur | | 0.5 | 0.5 | 0.5 | 0.5 | 0.5 | 0.5 | 0.5 | 0.5 | | |
| Soxinol ® DM*1 | | | | | | | | | | | |
| Soxinol ® NBS*2 | | 2.5 | 2.5 | 2.5 | 2.5 | 2.5 | 2.5 | 2.5 | 2.5 | | |
| N,N'—Hexamethylenebismaleimide | | | | | | | | | | | |
| N,N'—p-Phenylenebismaleimide | | | | | | | | | | | |
| N,N'—m-Phenylenebismaleimide | | | | | | 1.5 | | 1.5 | | | |
| N,N'—(methylene-di-p-bismaleimide | | | | | | | 1.5 | | | 1.5 | |
| N,N'—(Oxy-di-p-phenylene)bismaleimide | | | | | | | | 1.5 | | | 1.5 |
| Phthalic anhydride | | 1 | | | | | | | | | |
| Trimellitic anhydride | | | 1 | | | | | | | | |
| Maleic anhydride | | | | | | 1 | | | | | |
| Phthalic acid | | | | 1 | | | | 1 | | | |
| N—Nitrosodiphenylamine | | | | | 1 | | | | 1 | | |
| Properties | | | | | | | | | | | |
| MH (kg · cm) | | 72 | 58 | 57 | 56 | 61 | 62 | 61 | 62 | 61 | 61 |
| Rt (minute) | | 0.3 | 1.8 | 1.8 | 1.7 | 2.0 | 2.0 | 2.0 | 2.0 | 2.0 | 2.0 |
| Thermal resistance (%) | | 39 | 48 | 47 | 47 | 49 | 50 | 49 | 50 | 49 | 49 |
| Resistance to flex cracking (mm) | | 12.0 | 8.9 | 8.8 | 8.8 | 9.0 | 9.0 | 9.0 | 9.1 | 9.1 | 9.1 |

Note:
*1Soxinol ® DM: Dibenzothiazyl disulfide (mfd. by Sumitomo Chemical Co., Ltd.)
*2Soxinol ® NBS: N—Oxydiethylene-2-benzothiazylsulfenamide (mfd. by Sumitomo Chemical Co., Ltd.)

TABLE 4

| | | Example | | | | | | | Comparative Example | |
|---|---|---|---|---|---|---|---|---|---|---|
| Item | Run No. | 1 | 2 | 3 | 4 | 5 | 6 | 7 | 8 | 9 |
| Compounding ingredients | | | | | | | | | | |
| Sulfur | | 1.5 | 1.5 | 1.5 | 1.5 | 1.5 | 1.5 | 1.5 | 1.5 | 2.5 |
| Soxinol ® CZ*1 | | 2 | 2 | 2 | 2 | | | | 2 | 2 |
| Soxinol ® DM*2 | | | | | | 2 | 2 | 2 | | |
| N,N—Ethylenebismaleimide | | 1.5 | | | | | | | | |
| N,N'—p-Phenylenebismaleimide | | | 1.5 | | | | | | | |
| N,N'—m-Phenylenebismaleimide | | | | 1.5 | 1.5 | 1.5 | | | | |
| N,N'—(methylene-di-p-phenylene)bismaleimide | | | | | | | 1.5 | | | |
| N,N'—(Oxydi-p-phenylene)-bismaleimide | | | | | | | | 1.5 | | |

TABLE 4-continued

| | | | | | | | | | |
|---|---|---|---|---|---|---|---|---|---|
| Phthalic anhydride | 1 | 1 | 1 | | 1 | 1 | | | |
| Pyromellitic anhydride | | | | 1 | | | 1 | | |
| Phthalic acid | | | | | | | | | |
| N—Cyclohexylthiophthalimide | | | | | | | | | |
| Benzoic acid | | | | | | | | | |
| Properties | | | | | | | | | |
| MH (kg · cm) | 131 | 132 | 132 | 130 | 121 | 119 | 119 | 98 | 121 |
| Thermal resistance (%) | 78 | 78 | 79 | 74 | 73 | 73 | 73 | 68 | 54 |
| Resistance to flex cracking (mm) | 14.2 | 14.3 | 14.5 | 14.3 | 14.0 | 14.1 | 14.0 | 11.4 | 18.0 |

| | | Comparative Example | | | | | | | | |
|---|---|---|---|---|---|---|---|---|---|---|
| Item | Run No. | 10 | 11 | 12 | 13 | 14 | 15 | 16 | 17 | 18 |
| Compounding ingredients | | | | | | | | | | |
| Sulfur | | 1.5 | 1.5 | 1.5 | 1.5 | 1.5 | 1.5 | 1.5 | 1.5 | 1.5 |
| Soxinol ® CZ*1 | | 2 | 2 | 2 | 2 | 2 | 2 | 2 | 2 | |
| Soxinol ® DM*2 | | | | | | | | | 2 | 2 |
| N,N—Ethylenebismaleimide | | | | | | | | | | |
| N,N'—p-Phenylenebismaleimide | | | | 1.5 | | | 1.5 | | | |
| N,N'—m-Phenylenebismaleimide | | | | | 1.5 | | | 1.5 | | |
| N,N'—(methylene-di-p-phenylene)bismaleimide | | | | | | 1.5 | | | 1.5 | |
| N,N'—(Oxydi-p-phenylene)-bismaleimide | | | | | | | | | | |
| Phthalic anhydride | | 1 | | | | | | | | |
| Pyromellitic anhydride | | | 1 | | | | | | | |
| Phthalic acid | | | | 1 | | | | | | |
| N—Cyclohexylthiophthalimide | | | | | | | 1 | | | |
| Benzoic acid | | | | | 1 | | | | | |
| Properties | | | | | | | | | | |
| MH (kg · cm) | | 98 | 98 | 102 | 101 | 102 | 102 | 101 | 102 | 84 |
| Thermal resistance (%) | | 72 | 73 | 69 | 69 | 69 | 69 | 70 | 70 | 61 |
| Resistance to flex cracking (mm) | | 11.5 | 11.4 | 11.6 | 11.7 | 11.7 | 11.6 | 11.7 | 11.7 | 11.2 |

| | | Comparative Example | | | | | | | | |
|---|---|---|---|---|---|---|---|---|---|---|
| Item | Run No. | 19 | 20 | 21 | 22 | 23 | 24 | 25 | 26 | 27 |
| Compounding ingredients | | | | | | | | | | |
| Sulfur | | 2.5 | 1.5 | 1.5 | 1.5 | 1.5 | 1.5 | 1.5 | 1.5 | 1.5 |
| Soxinol ® CZ*1 | | | | | | | | | | |
| Soxinol ® DM*2 | | 2 | 2 | 2 | 2 | 2 | 2 | 2 | 2 | 2 |
| N,N—Ethylenebismaleimide | | | | | | | | | | |
| N,N'—p-Phenylenebismaleimide | | | | | | | | | | |
| N,N'—m-Phenylenebismaleimide | | | | | 1.5 | | | 1.5 | | |
| N,N'—(methylene-di-p-phenylene)bismaleimide | | | | | | 1.5 | | | 1.5 | |
| N,N'—(Oxydi-p-phenylene)-bismaleimide | | | | | | | 1.5 | | | 1.5 |
| Phthalic anhydride | | | 1 | | | | | | | |
| Pyromellitic anhydride | | | | 1 | | | | | | |
| Phthalic acid | | | | | 1 | | | | | |
| N—Cyclohexylthiophthalimide | | | | | | | 1 | | | |
| Benzoic acid | | | | | | 1 | | | | |
| Properties | | | | | | | | | | |
| MH (kg · cm) | | 109 | 84 | 83 | 103 | 108 | 107 | 109 | 108 | 108 |
| Thermal resistance (%) | | 54 | 60 | 59 | 66 | 67 | 67 | 68 | 67 | 68 |
| Resistance to flex cracking (mm) | | 16.9 | 11.2 | 11.3 | 13.8 | 13.9 | 14.0 | 13.8 | 13.8 | 13.9 |

Note:
*1Soxinol ® CZ: N—Cyclohexyl-2-benzothiazylsulfenamide (mfd. by Sumitomo Chemical Co., Ltd.)
*2Soxinol ® DM: Dibenzothiazyl disulfide (mfd. by Sumitomo Chemical Co., Ltd.)

TABLE 5

| | | Example | | | | | | Comparative Example | | |
|---|---|---|---|---|---|---|---|---|---|---|
| Item | Run No. | 1 | 2 | 3 | 4 | 5 | 6 | 7 | 8 | 9 |
| Compounding ingredients | | | | | | | | | | |
| Sulfur | | 1.5 | 1.5 | 1.5 | | | | 1.5 | 3 | 1.5 |
| Soxinol ® DM*1 | | 1 | 1 | 1 | 1 | 1 | 1 | 1 | 1 | 1 |
| Soxinol ® TT*2 | | 1 | 1 | 1 | 2 | 2 | 2 | 1 | 1 | 1 |
| N,N'—Hexamethylenebismaleimide | | 1.5 | | | 1.5 | | | | | |
| N,N'—m-Phenylenebismaleimide | | | 1.5 | | | 1.5 | | | | |
| N,N'—(methylenedi-p-phenylene)bismaleimide | | | | 1.5 | | | 1.5 | | | |
| Phthalic anhydride | | 1 | 1 | 1 | 1 | 1 | 1 | | | 1 |
| N—Cyclohexylthiophthalimide | | | | | | | | | | |
| Salicylic acid | | | | | | | | | | |
| Properties | | | | | | | | | | |
| MH (kg · cm) | | 104 | 105 | 103 | 82 | 84 | 88 | 80 | 104 | 80 |
| Rt (minute) | | >10 | >10 | >10 | >10 | >10 | >10 | 2.0 | 1.1 | 2.0 |
| Thermal resistance (%) | | 84 | 84 | 83 | 89 | 89 | 88 | 75 | 64 | 75 |
| Resistance to flex cracking (mm) | | 5.1 | 5.1 | 5.1 | 4.4 | 4.3 | 4.2 | 4.9 | 8.2 | 5.3 |

| | | Comparative Example | | | | | | | | | |
|---|---|---|---|---|---|---|---|---|---|---|---|
| Item | Run No. | 10 | 11 | 12 | 13 | 14 | 15 | 16 | 17 | 18 | 19 | 20 |
| Compounding ingredients | | | | | | | | | | | | |

TABLE 5-continued

| | | | | | | | | | | | |
|---|---|---|---|---|---|---|---|---|---|---|---|
| Sulfur | 1.5 | 1.5 | 1.5 | 1.5 | 1.5 | | | | | | |
| Soxinol ® DM*1 | 1 | 1 | 1 | 1 | 1 | 1 | 1 | 1 | 1 | 1 | 1 |
| Soxinol ® TT*2 | 1 | 1 | 1 | 1 | 1 | 2 | 4 | 2 | 2 | 2 | 2 |
| N,N'—Hexamethylenebismaleimide | 1.5 | | 1.5 | | | | | | 1.5 | | |
| N,N'—m-Phenylenebismaleimide | | 1.5 | | 1.5 | | | | | | 1.5 | |
| N,N'—(methylenedi-p-phenylene)bismaleimide | | | | | 1.5 | | | | | | 1.5 |
| Phthalic anhydride | | | | | | | | 1 | | | |
| N—Cyclohexylthiophthalimide | 1 | | | | | | | | | | |
| Salicylic acid | | 1 | | | | | | | | | |
| Properties | | | | | | | | | | | |
| MH (kg · cm) | 91 | 92 | 91 | 93 | 91 | 52 | 64 | 51 | 68 | 69 | 68 |
| Rt (minute) | 7.0 | 7.0 | 7.2 | 7.1 | 7.2 | 4.0 | 3.1 | 4.0 | 8.7 | 8.3 | 8.7 |
| Thermal resistance (%) | 80 | 81 | 81 | 80 | 81 | 80 | 72 | 79 | 84 | 88 | 84 |
| Resistance to flex cracking (mm) | 5.4 | 5.4 | 5.3 | 5.4 | 5.4 | 4.3 | 5.0 | 4.3 | 5.5 | 5.6 | 5.7 |

Note:
*1Soxinol ® DM: Dibenzothiazyl disulfide (mfd. by Sumitomo Chemical Co., Lt
*2Soxinol ® TT: Tetramethylthiuram disulfide (mf. by Sumitomo Chemical Co., Lt

What is claimed is:

1. A rubber composition comprising a rubber selected from the group consisting of natural rubber, styrene-butadiene rubber, butadiene rubber, isoprene rubber, acrylonitrile-butadiene rubber, chloroprene rubber, ethylene propylene-diene terpolymer and isoprene-isobutylene rubber, in combination with the following components:
(A) a bismaleimide compound represented by the general formula (I)

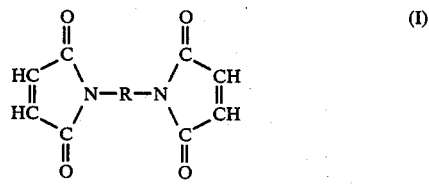

wherein R is a divalent acyclic aliphatic group, cyclic aliphatic group, aromatic group, or alkylaromatic group, and wherein these groups may contain a hetero atom selected from O, N, and S,
(E) an aromatic carboxylic acid anhydride,
(F) sulfur and/or a sulfur donor, and
(G) a vulcanization accelerator.

2. A rubber composition according to claim 1, wherein the bismaleimide compound represented by the general formula (I) is
N,N'-ethylenebismaleimide,
N,N'-hexamethylenebismaleimide,
N,N'-(m-phenylene)bismaleimide,
N,N'-(p-phenylene)bismaleimide,
N,N'-(p-tolylene)bismaleimide,,
N,N'-(methylenedi-p-phenylene)bismaleimide, or
N,N'-(oxydi-p-phenylene)bismaleimide.

3. A rubber composition according to claim 1, wherein the rubber is a rubber selected from the group consisting of natural rubber, styrene-butadiene rubber, and acrylonitrile-butadiene rubber.

4. A rubber composition according to claim 1 which contains 0.1 to 8 parts by weight of the bismaleimide compound (I), 0.1 to 4 parts by weight of the aromatic carboxylic acid anhydride, 0.1 to 14 parts by weight of sulfur and/or the sulfur donor and 0.1 to 8 parts by weight of the vulcanization accelerator, each based on 100 parts by weight of rubber.

5. A rubber composition according to claim 1, wherein the sulfur is powdered sulfur, precipitated sulfur, or insoluble sulfur.

6. A rubber composition according to claim 1, wherein the aromatic carboxylic acid anhydride is phthalic anhydride, pyromellitic anhydride, or trimellitic anhydride.

* * * * *